US009565704B2

(12) United States Patent
Zhu

(10) Patent No.: US 9,565,704 B2
(45) Date of Patent: Feb. 7, 2017

(54) METHOD AND SYSTEM FOR COMMUNICATION IN MULTI-USER MULTIPLE-INPUT-MULTIPLE OUTPUT WIRELESS NETWORKS

(71) Applicant: Samsung Electronics Co., Ltd., Suwon-si (KR)

(72) Inventor: Chunhui Zhu, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/987,311

(22) Filed: Jan. 4, 2016

(65) Prior Publication Data

US 2016/0119957 A1 Apr. 28, 2016

Related U.S. Application Data

(63) Continuation of application No. 13/177,386, filed on Jul. 6, 2011, now Pat. No. 9,232,543.

(60) Provisional application No. 61/362,280, filed on Jul. 7, 2010.

(51) Int. Cl.
*H04W 74/08* (2009.01)
*H04B 7/04* (2006.01)
*H04W 72/10* (2009.01)
*H04W 72/12* (2009.01)

(52) U.S. Cl.
CPC ....... *H04W 74/0841* (2013.01); *H04B 7/0452* (2013.01); *H04W 72/10* (2013.01); *H04W 72/1242* (2013.01)

(58) Field of Classification Search
CPC .. H04W 74/0841; H04W 72/10; H04B 7/0452
See application file for complete search history.

(56) References Cited

U.S. PATENT DOCUMENTS

| 9,232,543 | B2* | 1/2016 | Zhu | H04W 74/0841 |
| 2010/0002646 | A1* | 1/2010 | Nishibayashi | H04L 1/1621 |
| | | | | 370/329 |
| 2011/0194644 | A1* | 8/2011 | Liu | H04L 5/0023 |
| | | | | 375/295 |
| 2011/0235513 | A1* | 9/2011 | Ali | H04L 12/5693 |
| | | | | 370/232 |

(Continued)

*Primary Examiner* — Melvin Marcelo
(74) *Attorney, Agent, or Firm* — NSIP Law

(57) ABSTRACT

Wireless communication in a wireless system using a multiple user transmission opportunity is provided. The data blocks are organized in order of transmission priority based on access categories. Contention for access to the communication medium during a transmission opportunity period is based on a backoff timer of each access category and the transmission priority. Upon successful contention for a transmission opportunity period, during the transmission opportunity period, a data block of a primary access category is wirelessly transmitted from the wireless station to one or more primary destination wireless receivers. Simultaneously, a data block of a secondary access category is wirelessly transmitted from the wireless station to one or more secondary destination wireless receivers. Contending for the transmission opportunity period includes each access category contending for access to the wireless communication medium and a secondary access category selectively invoking communication medium access backoff based on one or more backoff events.

10 Claims, 8 Drawing Sheets

(56) References Cited

U.S. PATENT DOCUMENTS

| | | | | |
|---|---|---|---|---|
| 2012/0140615 A1* | 6/2012 | Gong | ................... | H04B 7/0452 370/216 |
| 2012/0218947 A1* | 8/2012 | Merlin | .............. | H04L 25/03343 370/329 |
| 2012/0314694 A1* | 12/2012 | Hsieh | .................. | H04W 74/085 370/338 |

* cited by examiner

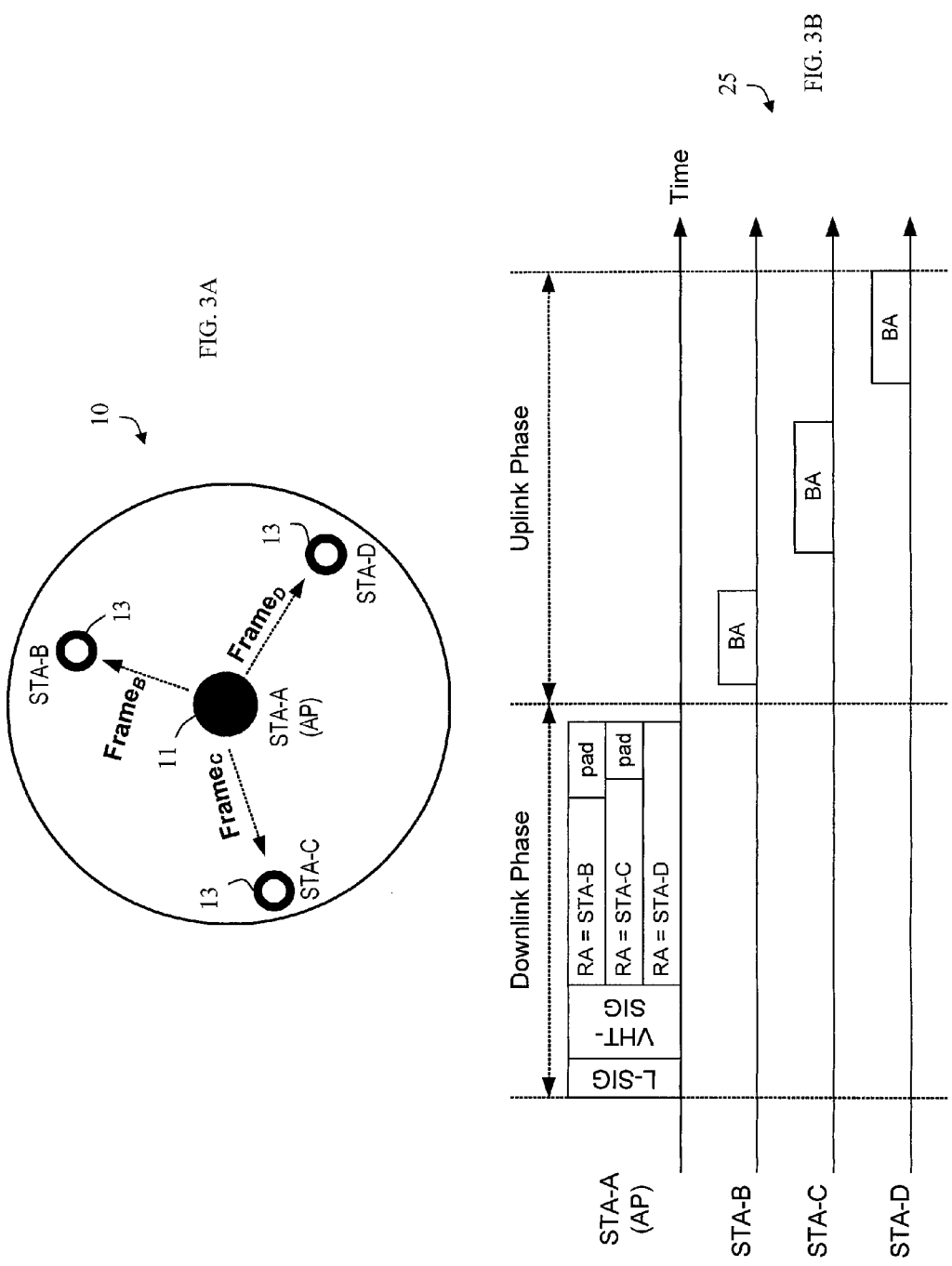

100

METHOD AND SYSTEM FOR COMMUNICATION IN MULTI-USER MULTIPLE-INPUT-MULTIPLE OUTPUT WIRELESS NETWORKS

RELATED APPLICATION

This application is a continuation of U.S. application Ser. No. 13/177,386 filed Jul. 6, 2011, which claims priority from U.S. Provisional Patent Application Ser. No. 61/362,280 filed Jul. 7, 2010, incorporated herein by reference.

FIELD

The present disclosure relates generally to the field of wireless networks, and in particular, to wireless networks where multiple antennas are used to transmit multiple downlink traffic streams to multiple receiver stations simultaneously.

BACKGROUND

In a typical wireless network utilizing a coordination function for coordinating transmissions among wireless stations, such a coordination function may be implemented in one of the wireless stations such as a wireless access point (AP) functioning as a coordinator. The wireless stations may communicate via directional transmissions using sector antennas and beam-forming antenna arrays. The coordinator may use omnidirectional transmissions for broadcasts to all wireless stations in all directions (e.g., 360 degrees range).

Alternatively, the coordinator may use quasi-omnidirectional transmissions for broadcasts to a wide range, but not necessarily in all directions. In many wireless area networks (WLANs) such as those according to IEEE 802.11 standards, a coordinator is used in infrastructure mode for providing contention-free access to a wireless communication medium to support Quality of Service (QoS) for certain applications.

BRIEF SUMMARY

Embodiments provide wireless communication in a wireless network using a multiple user transmission opportunity. One embodiment comprises maintaining data blocks at a wireless transmitting station for transmission to multiple wireless receiving stations over a shared wireless communication medium, wherein the data blocks are organized based on access categories.

Access to the communication medium includes contending for access to the wireless communication medium. Upon successful contention for a transmission opportunity period, during the transmission opportunity period, one or more data blocks of a primary access category are transmitted from the transmitting station to one or more primary destination wireless receiving stations, through one or more sets of spatial streams, over the wireless communication medium. Simultaneously, one or more data blocks of a secondary access category are transmitted from the transmitting station to one or more secondary destination wireless receiving stations, through other sets of spatial streams whenever possible, over the wireless communication medium.

Contending for the transmission opportunity period comprises each access category contending for access to the wireless communication medium, and a secondary access category selectively invoking communication medium access backoff based on one or more backoff events.

These and other features, aspects and advantages will become understood with reference to the following description, appended claims and accompanying figures.

BRIEF DESCRIPTION OF THE DRAWINGS

FIG. 3A shows an exemplary diagram of a wireless system implementing MU-TXOP for MU-MIMO communication, according to an embodiment of the present invention.

FIG. 3B shows an exemplary timing diagram of a wireless channel access and transmission sequence in a MU-TXOP for MU-MIMO communication.

DETAILED DESCRIPTION

Figure 1:
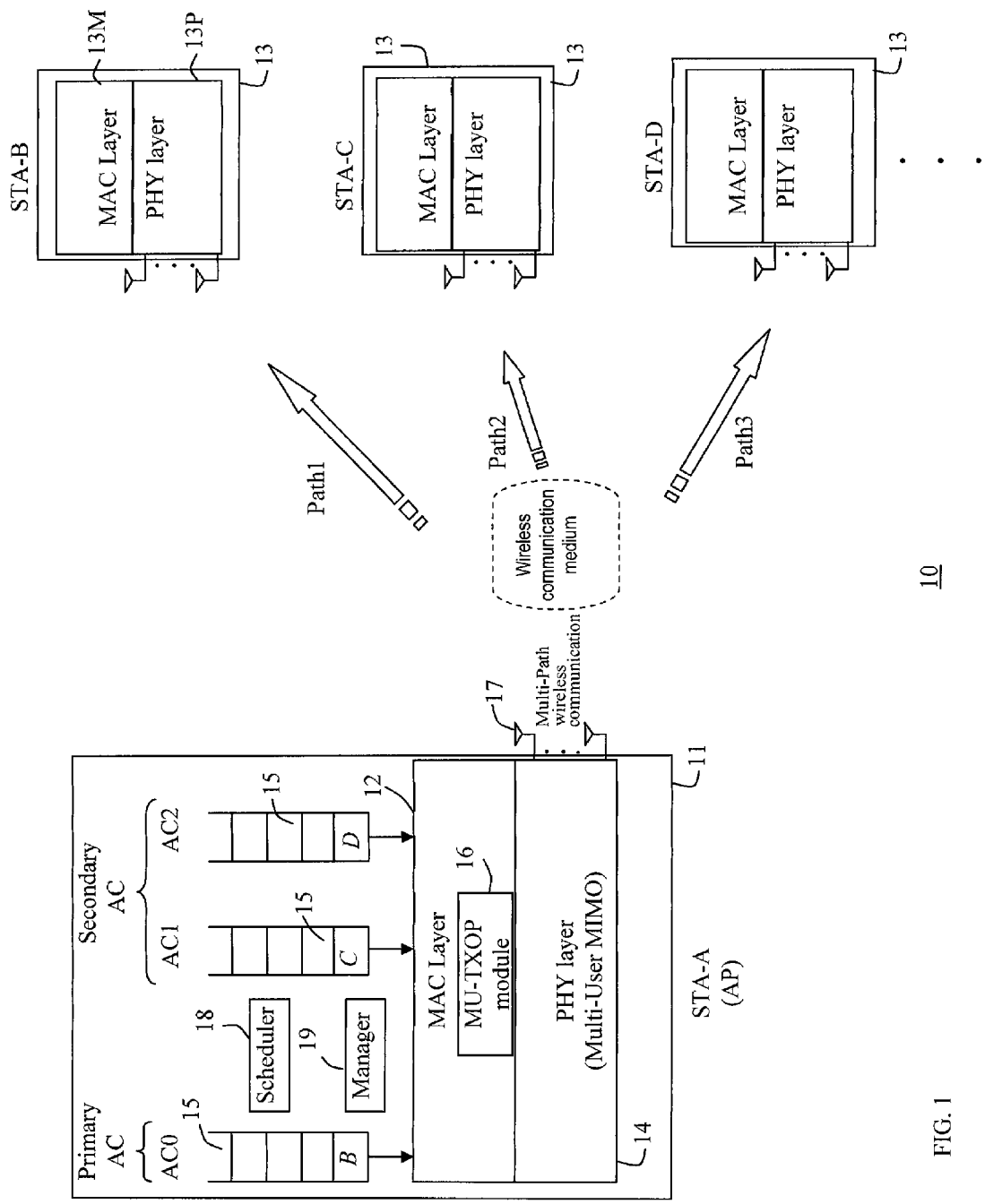
FIG. 1 shows an exemplary block diagram of a wireless system implementing multi-user transmit opportunity (MU-TXOP) for multi-user multiple-input-multiple-output (MU-MIMO) communication.

Embodiments of the present invention provide a method and system for simultaneously transmitting multiple downlink spatial streams to multiple receiver wireless stations during a multi-user transmit opportunity (MU-TXOP) over a wireless communication medium.

Generally in the absence of a coordinator, contention-free access to a wireless communication (e.g., a radio frequency (RF) channel) may be implemented using announcement or information exchange among wireless stations in a network to negotiate/reserve the use of the communication medium. For example, IEEE 802.11e Enhanced Distributed Channel Access (EDCA) provides QoS support for certain applications using announcement or information exchange. EDCA defines four Access Categories (ACs) and introduces service differentiation such that certain data traffic uses higher priority parameters to contend for the communication medium.

Further, a frame structure may be used for data transmission between wireless stations such as a transmitter station and a receiver station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver station, a preamble is attached to the PPDU, wherein the preamble can include channel estimation and synchronization information.

EDCA allows contention for transmission opportunities (TXOPs), wherein a TXOP is a time interval when a QoS wireless station (STA) may initiate frame transfer on the wireless medium (e.g., wireless channel). The TXOP may be assigned to the wireless station by a coordinator, or the wireless station may obtain the TXOP by successfully contending for the wireless channel.

Conventionally, a single user TXOP (SU-TXOP) defined in IEEE 802.11 standards is utilized per AC. As such, a SU-TXOP obtained by a station only sets the Network Allocation Vector (NAV) timer for a specific AC (used to contend for the TXOP), to idle during the SU-TXOP period. NAVs for other Access Categories (ACs) of the same station are set to busy. NAV is a counter maintained by each station, indicating the time to elapse until the channel is free again, such that a station cannot transmit until its NAV is zero. An EDCA TXOP is granted to Enhanced Distributed Channel Access Function (EDCAF) when the EDCAF determines that it may initiate a frame exchange sequence. During an EDCA SU-TXOP, a wireless station may initiate multiple frame exchange sequences to transmit MAC Management Protocol Data Units (MMPDUs) and/or MSDUs only within the same AC. Internal contention among frames belonging to different ACs allows only one AC to win the internal competition for the TXOP.

Disclosed embodiments herein provide a MU-TXOP mechanism for a wireless communication system such as a wireless network to support multiple downlink traffic streams to multiple receiver wireless stations simultaneously during the MU-TXOP (i.e., a shared transmission opportunity period). According to an embodiment, contention among access categories is resolved, in some cases, by allowing access categories to share a transmission opportunity period.

One embodiment comprises maintaining data blocks at a wireless transmitting station for transmission to multiple wireless receiving stations over a shared wireless communication medium, wherein the data blocks are organized based on access categories.

Access to the communication medium includes contending for access to the wireless communication medium. Upon successful contention for a transmission opportunity period, during the transmission opportunity period, one or more data blocks of a primary access category are transmitted from the transmitting station to one or more primary destination wireless receiving stations, through one or more sets of spatial streams, over the wireless communication medium. Meanwhile, one or more data blocks of a secondary access category are transmitted from the transmitting station to one or more secondary destination wireless receiving stations, through other sets of spatial streams whenever possible, over the wireless communication medium.

Contending for the transmission opportunity period comprises each access category contending for access to the wireless communication medium, and a secondary access category selectively invoking communication medium access backoff based on one or more backoff events.

In one embodiment the invention provides a method and system for communication in a wireless network such as a Wireless LAN (e.g., IEEE 802.11), where multiple antennas are used to transmit multiple downlink traffic streams from a wireless transmitter station to multiple wireless receiver stations simultaneously over a wireless communication medium. In one embodiment, the wireless communication medium comprises a wireless RF channel. Embodiments of said method and system provide channel access rules, including backoff procedures, when transmit opportunities can be shared by multiple Access Categories.

According to an embodiment, data blocks are maintained at a wireless transmitting station for transmission to multiple wireless receiving stations over a wireless medium. The data blocks are organized according to their access category, which assigns different transmission priorities to the data blocks. EDCAF of each AC of the transmitting station contends for access to the wireless medium based on its backoff timer value and transmission priority.

In one embodiment, an access category is divided into two classes when a TXOP is shared: a primary AC and a secondary AC. The destination wireless stations are divided into two classes, the primary destination and the secondary destination. When contending for transmission opportunity, only the EDCA parameters of the primary AC are used, not the combination of all ACs that have buffered data, or the EDCA parameters of the highest priority AC.

Upon successful contention for a transmission opportunity period, during the transmission opportunity period, one or more data blocks of a primary access category are transmitted from the transmitting station to one or more primary destination wireless receiving stations through one or more sets of spatial streams over the wireless communication medium. Simultaneously, one or more data blocks of one or more secondary access categories are transmitted from the transmitting station to one or more secondary destination wireless receiving stations, through one or more other sets of spatial streams over the wireless communication medium. Multiple frame transmissions are possible provided that the TXOP limit of the primary AC has not been reached.

In the description herein, primary AC comprises an AC that wins the TXOP for channel access after both external and internal competition. There can be only one primary AC at any moment. Secondary AC comprises an AC which does not win a TXOP but wishes to share the TXOP obtained by the primary AC for simultaneous transmissions. There can be multiple secondary ACs at any moment. Primary destinations comprise destinations targeted by frames belonging to the primary AC. There can be one or more primary destinations at any moment. Secondary destinations comprise destinations targeted by the frames belonging to secondary ACs. There can be one or more secondary destinations at any moment.

According to an embodiment, internal contention among access categories is resolved by allowing secondary ACs to share a TXOP. In one embodiment, the invention provides a backoff procedure for an EDCA-based, Multi-User MIMO equipped Wireless LAN. In one implementation, a backoff procedure for EDCA-based channel access provides backoff rules when a TXOP (e.g., MU-TXOP) is shared by multiple ACs.

In one embodiment, the present invention provides a backoff process for MU-TXOP. In one implementation, for a secondary AC if the communication medium is physically busy, the transmitter station should perform backoff as is routine (e.g., as in conventional IEEE 802.11 standards). However, if the communication medium is virtually busy, in the transmitter station the secondary AC checks whether any other AC of the transmitter station has won the TXOP and whether sharing the TXOP is possible. If sharing of TXOP is granted to this AC, the AC will then transmit and will not invoke backoff, otherwise, the secondary AC invokes backoff as is routine.

Because the secondary AC is sharing the TXOP obtained by the primary AC, its transmission of data frames is limited by the length of TXOP obtained by the primary AC. A sharing rule requires that the time used to transmit the frames of the secondary AC cannot exceed the time used to transmit the frames of the primary AC. Therefore, the length of the shared TXOP may or may not fulfill the requirement of transmitting what the secondary AC plans to transmit. In one implementation of the invention, the secondary AC has not finished transmission of what it plans to transmit as if the TXOP was obtained by itself, whereby the desired transmission is partially completed. The secondary AC may resume its timer countdown from the previously frozen value in order to obtain its own TXOP or upon an opportunity to share again with other primary TXOPs that will follow.

When transmission of a frame for a secondary AC fails, in one implementation the secondary AC invokes backoff together with other ACs that experienced transmission failure, while in another implementation the secondary AC may utilize Direction Based Backoff (DBB), as described further below.

When a transmission attempt of an EDCAF of an AC collides internally with another EDCAF of the AC of higher priority, if such collision cannot be eliminated by TXOP sharing, then exponential backoff is utilized. If such collision cannot be resolved, then backoff is not invoked.

As noted, in one embodiment, a DBB mechanism is provided for circumstances where the transmissions are performed via directional (e.g., beamforming) transmissions. This allows the transmitting wireless station (sender) to identify a collision spatial area and only invoke backoff for frames sent to that specific direction/destination. For other non-collision areas (including other directions/destinations), the sender need not invoke backoff. This allows secondary ACs to resume their transmission at their own pace (using a backoff timer and a Contention Window (CW) before the TXOP sharing) when their intended transmission has been partially performed by sharing the TXOP obtained by another AC. Direction Based Backoff allows the sender to invoke backoff in a collision area near one or more specific receiver(s) and still be able to send to areas that are not experiencing collision without invoking backoffs. This increases the network throughput.

Embodiments of the invention are useful with WLANs (such as IEEE 802.11 ac) for Downlink (DL) Multi-User MIMO (DL MU-MIMO) communication. Embodiments of the invention allow multiple traffic streams to be transmitted from a wireless transmitting station (sender) to different wireless receiving stations simultaneously via multiple spatial streams through the use of beamforming technology.

FIG. 1 shows an exemplary wireless network 10. The wireless network comprises a WLAN comprising multiple wireless stations. A wireless station 11 (i.e., STA-A) comprises an AP having a PHY layer 14 and a MAC layer 12 implementing an EDCA MU-TXOP module (i.e., channel access module) 16. Several traffic streams (or queues) of data frames (packets) in multiple different access categories ACs at the AP station 11 are for transmission to multiple receiver wireless stations 13. Each wireless station 13 comprises a MAC layer 13M and a PHY layer 13P.

In this example, there are three traffic streams (or queues) of data frames (packets) in three different access categories AC0, AC1, and AC2 at the AP station 11 for transmission to receiver wireless stations 13 (i.e., STA-B, STA-G and STA-D), respectively. AC0 is a primary AC, and AC1 and AC2 are secondary ACs.

MU-TXOP according to the invention is useful in both EDCA and hybrid coordination function controlled channel access (HCCA). The example embodiments described herein are for EDCA, wherein a MU-TXOP is assigned to a MU-MIMO wireless station such as the AP station 11 in FIG. 1.

In one embodiment, the EDCA MU-TXOP module 16 implements three modes. A first mode involves initiation of the EDCA MU-TXOP which occurs when the EDCA rules permit access to the wireless communication medium (e.g., wireless RF channel). A second mode involves sharing of the EDCA MU-TXOP which occurs after an EDCAF is granted the TXOP. A third mode involves multiple frame transmission within an EDCA MU-TXOP, which occurs when an EDCAF retains the right to access the wireless communication medium following the completion of a frame exchange sequence, such as on receipt of multiple block acknowledgement (BA) frames from receiving wireless stations 13. The three examples EDCA MU-TXOP modes are described further below.

In one embodiment, an initiation of the MU-TXOP occurs when the EDCA rules permit access to the wireless communication medium. Although there may be other factors that affect the transmission decision (such as scheduling), in general, the EDCAF of an AC of the transmitting AP station 11 is allowed to access the wireless communication medium if all the following conditions are satisfied:
1) The backoff timer of the AC has counted down to zero when the backoff slot boundary is reached;
2) The AC has higher priority than other ACs;
3) The AC has buffered data to transmit.

When an AC is allowed to access the wireless communication medium after winning both the external (with other STAs) and the internal (with other ACs of the same STA) competition, it becomes the primary AC. An EDCA MU-TXOP is granted to the EDCAF of this AC. Other ACs become secondary ACs and may be able to share the obtained EDCA MU-TXOP.

According to an embodiment, when contending with other stations for transmission opportunity for access to the wireless communication medium (e.g., radio frequency wireless channel), the rules the AP station 11 uses remain the same as in the conventional IEEE 802.11 wireless communication specifications. Each AC of the AP station uses a set of EDCA parameters of this AC (e.g., AIFS[AC]) to contend for wireless channel access.

The AP station 11 may not always use its highest priority AC for contending the TXOP even though the highest priority AC may be able to share the TXOP for simultaneous transmission. Otherwise, such a behavior by AP station 11 in using its highest priority AC for contending the TXOP will break the fairness of EDCA access rules, and other non-AP stations (such as stations 13) will have less chance and less time for transmission.

In one embodiment, the ACs (e.g., AC0, AC1, AC2) at the AP station 11 are divided into two classes: primary AC and secondary AC. A primary AC is an AC that wins both external competition among multiple STAs 13, and internal competition among multiple ACs at the AP station 11. The primary AC is not always the highest priority AC (e.g., AC0 in FIG. 1) even though the highest priority AC has a better chance to become a primary AC. The primary AC is the "actual holder" of the MU-TXOP. Secondary ACs include the remaining ACs at the AP station (e.g., AC1, AC2). The frames of the secondary ACs share the MU-TXOP with the frames of the primary AC, for essentially simultaneous transmission from the AP station 11 to multiple receiver stations 13 over the wireless channel.

The destination wireless stations 13 targeted by the frames of the primary AC at the AP station 11 are defined as primary wireless station destinations. If the frames of the primary AC target more than one destination wireless station, there will be multiple primary destinations. The destination wireless stations 13 only targeted by frames of secondary ACs are defined as secondary destinations. When the frames of the primary AC and frames of one or more secondary ACs target the same destination wireless station, the destination wireless station is still a primary destination and the frames of the secondary ACs must yield to the frames of the primary AC.

According to an embodiment, sharing of a MU-TXOP allows secondary ACs to transmit their data frames in the TXOP period obtained by the primary AC at the AP station 11. In one embodiment, sharing takes place when the following conditions are satisfied:
1) Frames for multiple STAs exist.
2) DL MU-MIMO transmission is possible: [0056] If, for example, the primary AC and one or more ACs have frames targeting to the same destination STA, then DL MU-MIMO transmission is not possible. In this case, single user MIMO (SU-MIMO as in conventional IEEE 802.11n standard) can be used for transmitting the data of the primary AC at the AP station 11 and a secondary AC cannot share the TXOP.
3) DL MU-MIMO transmission is appropriate:
In certain cases, both conditions 1) and 2) above are met, but it is still not appropriate to use MU-MIMO protocol and share MU-TXOP. For example, when two or more destination STAs 13 targeted by both primary and secondary AC at the AP station are spatially too close to each other (exposing the stations to potential RF interference), then SU-MIMO is a more appropriate transmission protocol at the AP station 11.

In one embodiment, sharing a MU-TXOP is performed by grouping of the wireless stations 13, wherein the primary wireless station destinations are grouped with one or more secondary wireless station destinations. The MAC layer 12 at the AP station 11 can group one or more primary wireless station destinations with one or more secondary wireless station destinations in different ways. In one implementation, a GroupID can be assigned to a selected group of wireless station destinations and utilized to identify them. Each wireless station in the selected group has knowledge of the group definition (i.e., GroupID) prior to data transmission for correct reception of the data frames at such wireless station destinations 13.

Once secondary wireless station destinations are selected, the corresponding secondary ACs at the AP station 11 treat the wireless channel as idle to allow simultaneous transmissions.

Internal competition among the ACs at the AP station 11 for a TXOP is resolved by allowing secondary ACs to transmit in the same TXOP of the primary AC. However, in certain cases simultaneous transmissions are not possible. In one of such cases, frames of different ACs transmit to the same destination wireless stations. In another such case, the transmission time of the secondary ACs is longer than that of the primary AC at the AP station 11, wherein the secondary AC is unwilling to fragment the frame (or it is not possible to fragment). In that case, the additional time taken by the secondary AC for transmission may lead to unfairness to other stations in the WLAN Basic Service Set (BSS).

When parallel (i.e., simultaneous) transmission is not possible at the AP station 11, a lower priority AC backs off as in the conventional IEEE 802.11 standard. The primary AC may choose to use SU-MIMO for its own transmission, after the lower priority AC backs off.

In one embodiment, a scheduler 18 at the AP station (FIG. 1) determines which frames (data blocks) 15 are to be transmitted to multiple receiver stations, wherein the frames are organized into ACs based on QoS rules, and arranged into queues accordingly. A manager module 19 determines the primary AC to be used for contending for a transmission opportunity.

Figures 2A, 2B:
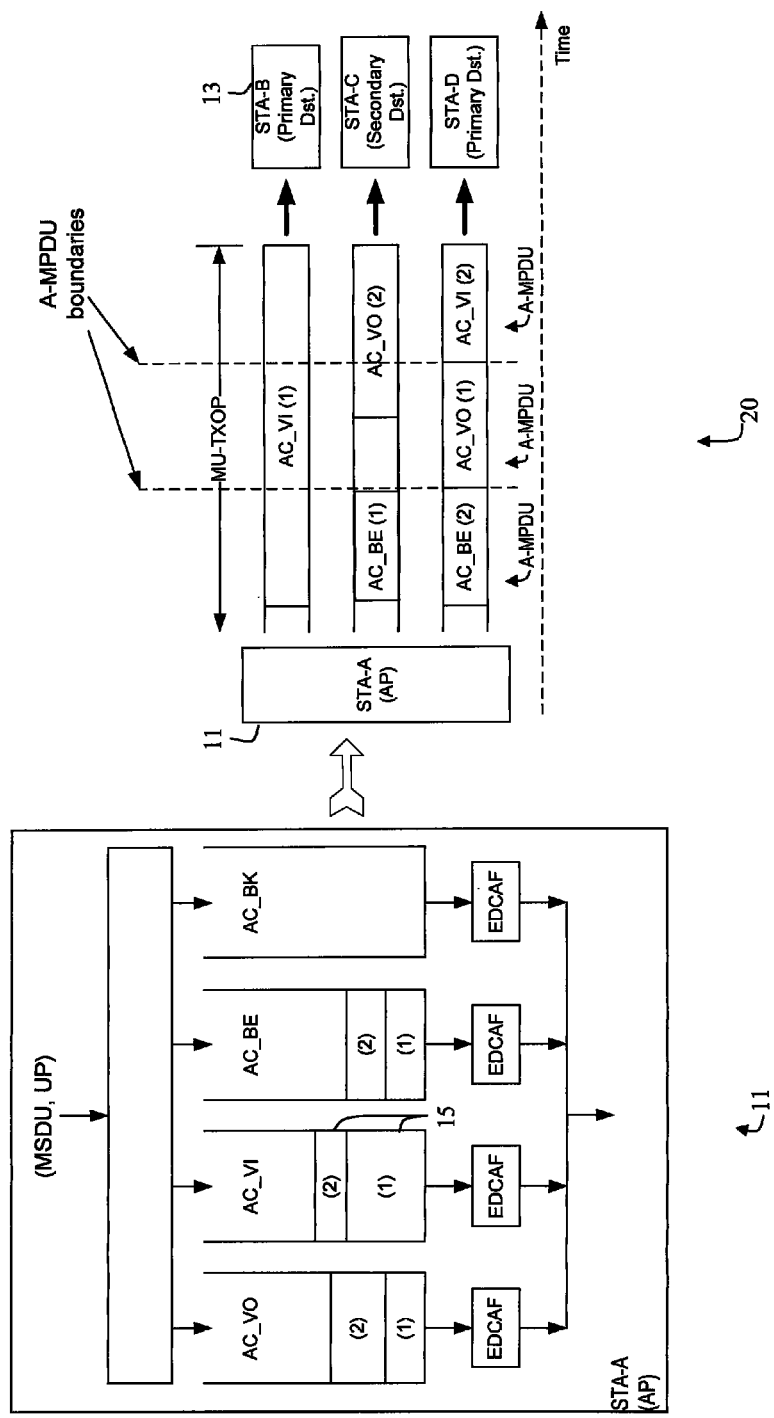
FIG. 2A shows an example Access Category (AC) scenario at an access point (AP) station for simultaneous frame transmission to multiple destination stations during a MU-TXOP over a wireless communication medium.
FIG. 2B shows an example timing diagram of a frame exchange sequence corresponding to FIG. 2A.

FIGS. 2A-2B show an example wherein data frames in different ACs at the AP station 11 (FIG. 2A) can share the MU-TXOP. In FIG. 2A, it is assumed that AC_VI is the primary AC having two sets of MSDU frames 15 (e.g., AC_VI(1) and AC_VI(2)) in memory buffer to wirelessly transmit, one for destination station STA-B and the other for destination station STA-D. As such, both destination STA-B and STA-D are primary destinations. AC_VO and AC_BE are secondary ACs, and destination STA-C is a secondary destination.

Further, AC_VO has two sets of MSDU frames for transmission, a first set AC_VO(1) for transmission to destination STA-D and a second set AC_VO(2) for transmission to destination STA-C. In addition, AC_BE has two sets of MSDU frames, a first set AC_BE(1) for transmission to destination STA-C and a second set AC_BE(2) for transmission to destination STA-D. A remaining AC_BK has no frames to transmit. FIG. 2B shows a corresponding transmission process 20 for the aforementioned MSDU frames from the primary and secondary ACs in AP station 11 using a shared MU-TXOP over a wireless communication channel to the destination wireless stations 13 in a frame exchange sequence. The wireless stations 13 may transmit responsive frames (e.g., acknowledgment (ACK) frames) back to the AP station 11 over the wireless communication medium.

The MSDU frames 15 in memory buffer at the AP station 11 may be fragmented or aggregated into multiple Aggregated MAC Protocol Data Units (A-MPDUs), each being transmitted in one downlink phase.

According to an embodiment, once a MU-TXOP is granted to the AP station 11, in a frame exchange sequence with destination stations 13, the frames associated with different ACs at the AP station 11 share that MU-TXOP for downlink transmissions to multiple wireless stations 13, wherein all the transmissions take place at the same time via different spatial streams over the wireless communication medium. Therefore, the MU-TXOP is shared among multiple sets of spatial streams (each set targeting one destination station) that can belong to multiple ACs for the downlink transmission from the AP station 11 to multiple destination wireless stations 13. Unlike SU-TXOP, data frames belonging to secondary ACs that are scheduled to be transmitted with that of the primary AC use the same TXOP for transmission at the AP station 11.

In one example in the network 10 of FIG. 1, during a MU-TXOP, multiple traffic/transmission streams/paths belonging to different access categories AC0, AC1, AC2 at the AP station 11 are transmitted simultaneously over a wireless communication medium to multiple wireless stations 13 (i.e., STA-B, STA-C and STA-D) over multiple wireless streams/paths (i.e., Path1, Path2, Path3). The AP station 11 implements multi-user multiple-input-multiple-output (MIMO) at its PHY layer 14 for such simultaneous wireless transmissions via multiple antennas 17 to the wireless stations 13 over the wireless communication medium.

In one embodiment, the MU-TXOP module 16 at the MAC layer of the AP station 11 comprise protocols, hardware and/or software implementations, which support downlink (DL) multi-user MIMO (DL MU-MIMO) wireless communication to the wireless stations 13 over the wireless communication medium. In the network 10, DL MU-MIMO wireless communication allows a sender station such as the AP station 11 to obtain a MU-TXOP for simultaneously transmitting frames 15 in AC0, AC1 and AC2 via multiple traffic streams to different receiving wireless stations 13 such as STA-B, STA-C, STA-D, using directional transmission via the wireless communication medium. In one embodiment, multi-user directional transmissions using beam-forming are utilized between the AP station 11 and each of the multiple wireless stations 13 (i.e., STA-B, STA-C, STA-D). Beam-steered wireless signals comprise directional beam signals, wherein each directional beam (i.e., path) comprises a main lobe and side lobes.

In one embodiment, the TXOP duration is determined by the TXOP limit of the primary AC. At least one spatial stream set in each DL MU-MIMO PPDU contains only MSDU(s) corresponding to the primary AC, wherein a stream set is defined as a group of spatial streams of a DL MU-MIMO PPDU that are all intended for reception by a single recipient station. As used herein, PPDU stands for physical (PHY) layer convergence procedure (PLCP) protocol data unit.

FIG. 3A illustrates an example downlink transmission in the wireless network 10 involving multi-user MIMO transmission of frames B, C, D from the AP station 11 (STA-A) to the receiver stations STA-B, STA-C, STA-D during a MU-TXOP, respectively, via directional transmissions over the wireless communication medium.

FIG. 3B shows a timing diagram 25 for the example communication in FIG. 3A, wherein during a MU-TXOP in a downlink phase, the AP station 11 (STA-A) simultaneously directionally transmits three frames B, C, D (each with a specified destination receiver station address (RA)) to the receiver stations 13 (STA-B, STA-C and STA-D), respectively. In an uplink phase, each of the receiver stations 13 sends a block acknowledgement (BA) to the AP station 11 sequentially using a predefined schedule, over the wireless communication medium.

During an EDCA MU-TXOP obtained by an EDCAF at the AP station 11, the MU-MIMO AP station 11 may initiate multiple frame exchange sequences with destination wireless stations 13 to transmit MMPDUs and/or MSDUs belonging to different ACs. For each frame exchange sequence, there can be multiple simultaneous spatial streams targeting different receiver stations 13, belonging to different ACs at the AP station 11.

The MU-TXOP process according to an embodiment, allows frames belonging to different ACs at the AP station 11 to be transmitted using a TXOP obtained for the frames of the primary AC at the AP station 11. In one implementation, frames 15 belonging to a lower priority AC at the AP station 11 can share the TXOP as long as such frames are essentially of similar length as that of the primary AC. As such throughput can be increased without negatively affecting application QoS rules for the involved frames 15. Using frames of similar length provides an AP the flexibility to select among the secondary AC frames for transmission.

A MU-TXOP is obtained only using EDCA parameters of the primary AC at the AP station 11, neither a combination of all ACs involved, nor always the highest priority AC that has frames to transmit. Though a MU-TXOP is obtained using EDCA parameters of the primary AC, the MU-TXOP is shared by multiple traffic streams from the AP station 11 to the destination station 13, which may or may not belong to that AC.

In one embodiment, the same GroupID for the selected destination stations 13 is used to identify the destination stations 13 during the entire multiple frame exchange sequence between the AP station 11 and the destination stations 13. In an alternative embodiment, GroupID may be changed during the multiple frame exchange sequence. This may be more efficient when the number of destination stations 13 is large (e.g., larger than 4) and the TXOP duration is long.

In one embodiment, multiple frame exchanges may be performed between the AP station 11 and the destination stations 13 when the primary AC possesses remaining frames to transmit in its buffer (queue). In one embodiment, once the primary AC at the AP station completes its transmission, the MU-TXOP terminates even if secondary ACs posses remaining frames 15 in their buffers. As such, secondary ACs can transmit their frames as long as the primary AC has not completed transmission of its frames at the AP station 11. Once the primary AC has completed transmission of its frames, the frames of secondary ACs cannot be transmitted and need to await a next MU-TXOP. When the primary AC completes its frame transmission, the MU-TXOP can be terminated by the MU-MIMO AP station 11 by transmitting a contention-free end (CF-End) frame over the wireless communication medium if the remaining time is sufficient for transmission of such a CF-End frame.

Figure 5:
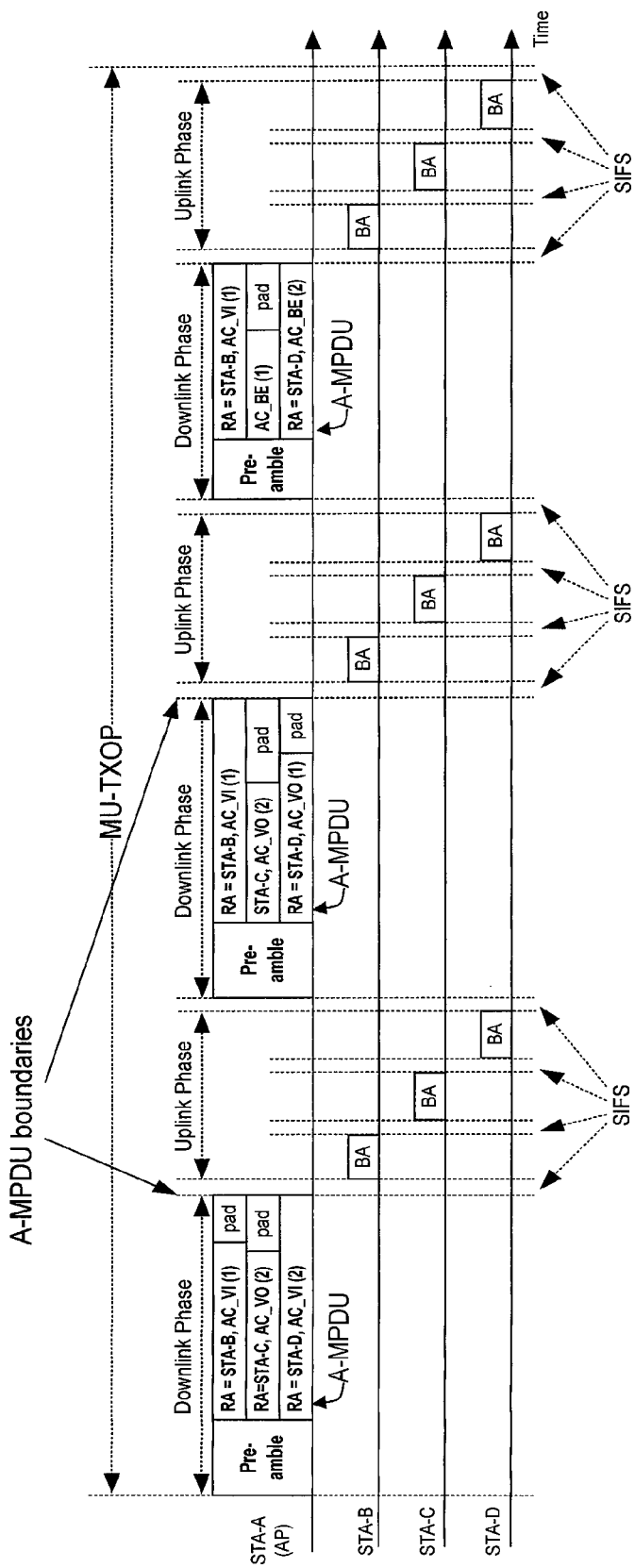
FIG. 5 shows an exemplary timing diagram of a wireless channel access and transmission sequence in a MU-TXOP for MU-MIMO communication according to the process in FIG. 4.

In one embodiment of the invention, to transmit frames 15 of different ACs from the AP station 11 to different destination station 13, the frames may be aggregated into one A-MPDU utilizing a frame aggregation process, and utilizing a multi-traffic block ACK (MTBA). In one implementation, as illustrated by the timing diagram 50 in FIG. 5, short interframe spaces (SIFSs) may be used to separate frames between downlink transmission (from AP station 11 to a destination station 13) and uplink transmission (from a destination station 13 to AP station 11) phases, as well as multiple response frames (i.e., clear-to-send or CTS) on responsive uplink transmissions. The assumptions for FIG. 5 are the same as that for FIGS. 2A-2B. In FIG. 5, a scheduled BA scheme is used for the uplink phase, which does not prevent other acknowledgements schemes to be utilized (e.g., a poll-based acknowledgement scheme).

In one embodiment, frame fragmentation or aggregation may be applied to frames for secondary ACs at the AP station 11 such that the transmission time of frames for secondary ACs are similar to that of the frames of the primary AC for each frame exchange sequence. In one embodiment of the invention, all stations 11 and 13 contend for transmission opportunity again after a MU-TXOP ends.

In one embodiment, the duration of EDCA MU-TXOP is bounded by the primary AC at the AP station 11. Such duration can be as defined by IEEE 802.11 standards based on dot11QAPEDCATXOPLimit MIB variable for an access point. A value of 0 for EDCA MU-TXOP duration means that the EDCA MU-TXOP is limited to a single frame exchange sequence, in time domain, at any transmission rate in the operational set of the BSS. The AP station 11 may transmit multiple frames in the spatial domain to multiple receiver stations 13, wherein each frame is carried by a spatial stream set. There can be multiple frames in the spatial domain, each for one receiver station.

Each spatial stream set contains a group of spatial streams of a downlink MU-MIMO PPDU that are all intended for reception by a single receiver station 13. In one embodiment, at least one stream set in each DL MU-MIMO PPDU contains only MSDU(s) corresponding to the primary AC. This is to ensure that the AP does not transmit only frames of secondary ACs during any downlink phase.

Figure 4:
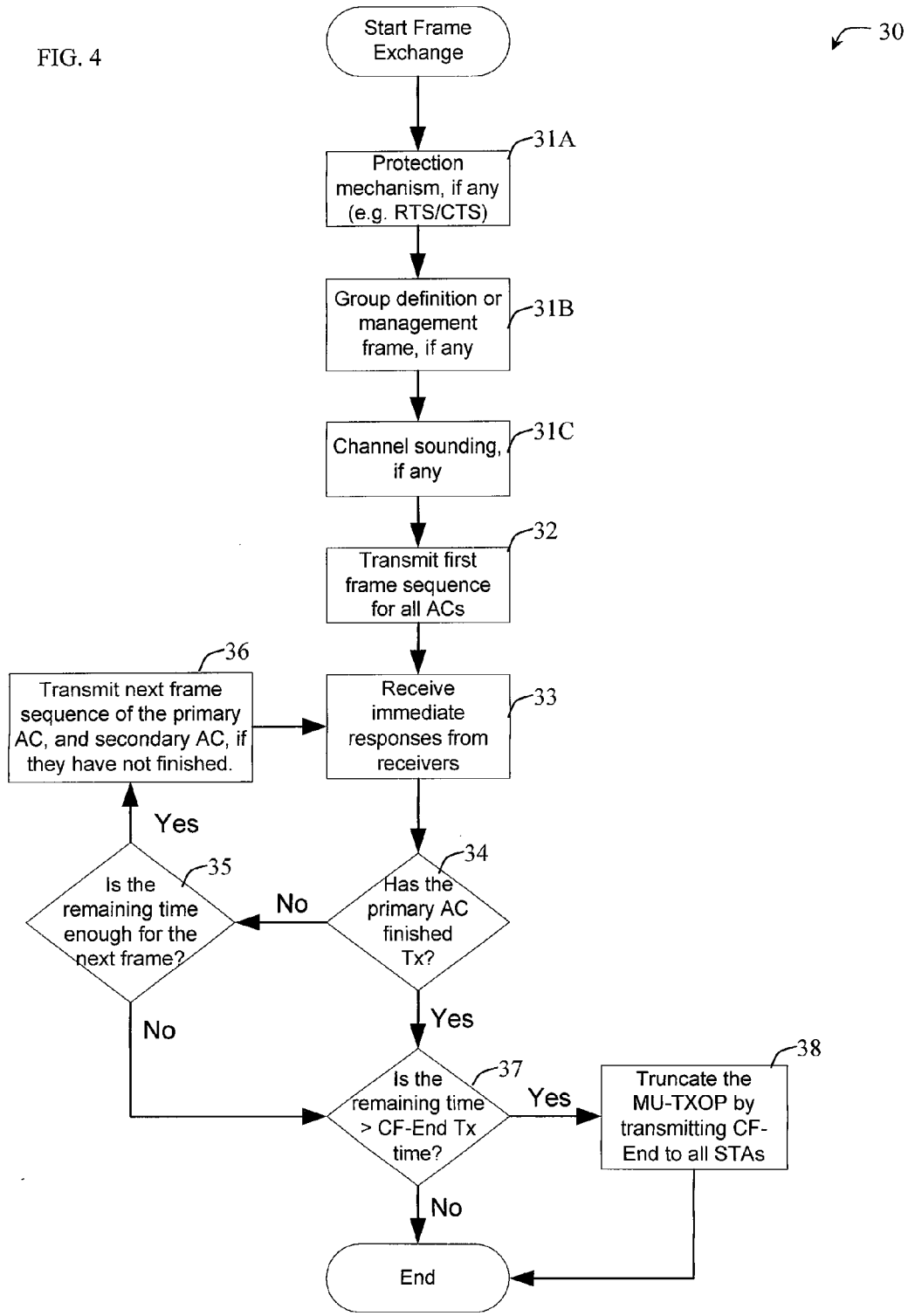
FIG. 4 shows an exemplary flowchart of a frame exchange process using MU-TXOP in a wireless system implementing MU-MIMO.

FIG. 4 shows an exemplary flowchart of a process 30 for frame exchange between an AP station (such as AP station 11) and destination wireless stations (such as stations 13) using MU-TXOP. The example timing diagram in FIG. 5 may be based on the frame sequence exchange process 30 according in FIG. 4, wherein frames to destination STA-B have the highest AC priority (primary AC). Referring to process 30 in FIG. 4, in conjunction with FIG. 5, in block 31A, a collision protection mechanism such as request-to-send (RTS) and CTS protocol is utilized to prevent packet collision on a shared wireless communication channel. In block 31B, group definition information through management frame (if any needed) is provided. In block 31C, channel sounding (if any needed) is performed.

In block 32, during an assigned MU-TXOP, the AP station 11 performs downlink transmission of a first frame sequence for all ACs at the AP station 11 to multiple receiver stations 13 via multiple spatial streams. In block 33, the AP station 11 receives acknowledgment responses (e.g., BA) from the receiver stations 13. In block 34, the AP station 11 determines if the primary AC frames have completed transmission. If not, in block 35 it is determined if there is sufficient time remaining in the MU-TXOP for remaining frames at the AP station 11. If sufficient time remains in the MU-TXOP, then in block 36, a next frame sequence of the primary AC and any remaining secondary ACs, are transmitted from the AP station 11 to receiver stations 13 via multiple spatial streams, and the process proceeds to block 33.

If insufficient time remains in the MU-TXOP for AC frame transmission, then the process proceeds to block 37 wherein it is determined if the remaining time is sufficient for transmission of a CF-End frame. If yes, then in block 38 the MU-TXOP is terminated (truncated) by transmission of a CF-End frame from the AP station 11 to all destination stations 13. Further, if in block 34 it is determined that the primary AC frames have all been transmitted, then the process proceeds to block 37. In the example shown in FIG. 5, after AC frame transmissions, at the end of the MU-TXOP, the remaining time is insufficient for transmitting a CF-End frame. Note that frames belonging to secondary ACs may be longer or shorter than frames of the primary AC at each frame exchange sequence. Further, the terms "stream" and "path" need not be equivalent. For example, it is possible that an AP uses multiple streams to transmit to one STA.

According to an embodiment of invention, a TXOP is obtained by a transmitting wireless STA to be shared by multiple data frames, which may belong to different ACs. This allows multiple frames belonging to different ACs to be transmitted simultaneously. A MU-TXOP mechanism allows the owner of a TXOP (i.e., primary AC) to share the obtained TXOP with other ACs that did not obtain the TXOP (i.e., secondary ACs). When MU-TXOP is used, ACs are classified into primary and secondary ACs. There are different backoff procedures for primary AC and secondary AC.

Events Types that Invoke Backoffs

According to conventional IEEE 802.11 standard, a backoff procedure is invoked for an AC in a EDCAF-based channel access process when any of the following events occurs: \

Event a: A frame with that AC needs to be transmitted, wherein the communication medium is busy as indicated by either physical or virtual CS, and the backoff timer has a value of zero for that AC.

Event b: The final transmission by the TXOP holder initiated during the TXOP for that AC was successful.

Event c: The transmission of a frame of that AC fails, indicated by a failure to receive a CTS in response to an RTS, a failure to receive an ACK frame that was expected in response to a unicast MPDU, or a failure to receive a BlockAck or ACK frame in response to a BlockAckReq frame.

Event d: The transmission attempt collides internally with another EDCAF of an AC that has higher priority, that is, two or more EDCAFs in the same STA are granted a TXOP at the same time.

Backoff Procedures for Each Backoff Event Type in the IEEE 802.11 Standard

Event a: Backoff is invoked and the value of CW[AC] is left unchanged.

Event b: Backoff is invoked and the value of CW[AC] is reset to CWmin[AC].

Event c and Event d: Both are failure events, wherein backoff is invoked and the value of CW[AC] is updated as follows before invoking a backoff procedure:

If the QSRC[AC] or the QLRC[AC] for the QoS STA has reached dot11ShortRetryLimit or dot11LongRetryLimit respectively, CW[AC] shall be reset to CWmin[AC];

Otherwise,

1) If CW[AC] is less than CWmax[AC], CW[AC] shall be set to the value (CW[AC]+1)*2−1.

2) If CW[AC] is equal to CWmax[AC], CW[AC] shall remain unchanged for the remainder of any retries.

A backoff timer is set to an integer value selected randomly with a uniform distribution taking values in the range [0,CW[AC]] inclusive. All backoff slots occur following an AIFS[AC] period during which the wireless communication medium is determined to be idle for the duration of the AIFS[AC] period, or following an EIFS-DIFS+AIFS[AC] period, during which the wireless communication medium is determined to be idle for the duration of the EIFS-DIFS+AIFS[AC] period, as appropriate.

Backoff procedures for MU-TXOP support according to embodiments of the invention, summarized further above, are described below in more detail.

Backoff procedures are disclosed herein for the EDCA-based channel access mechanism based on MU-TXOP according to embodiments of the invention.

Primary AC Backoff Process

The primary AC follows backoff rules as above for all backoff event types. This is to maintain fairness among the transmitting wireless station and all other wireless stations in the BSS. When the primary AC targets more than one destination wireless station with transmission of different spatial streams simultaneously, wherein certain transmissions succeeded while others fail, successful transmission is defined as at least one of the destination wireless stations successfully receiving said transmissions (i.e., transmitted information frames). The transmission is considered failed only if all destination wireless stations failed to receive said transmissions.

In another embodiment, successful transmission is defined as the first expected acknowledgement of the initial downlink transmission in a series of downlink transmissions (e.g. BA from STA-B) is received from the destination wireless stations successfully receiving said transmissions (i.e., transmitted information frames). The transmission is considered failed only if the first expected acknowledgement of the initial downlink transmission in a series of downlink transmissions is not received.

Secondary AC Backoff Process

A backoff process for a secondary AC in response to each of the above-mentioned backoff events, according to embodiments of the invention, is described below.

In general, a secondary AC is provided an opportunity to share a TXOP (e.g., MU-TXOP) with the primary AC (a free ride) without negative impact on the operation of the primary AC. Further, a secondary AC shares the TXOP with the primary AC as long as it does not have a negative impact on its own transmit opportunity.

Figure 6:
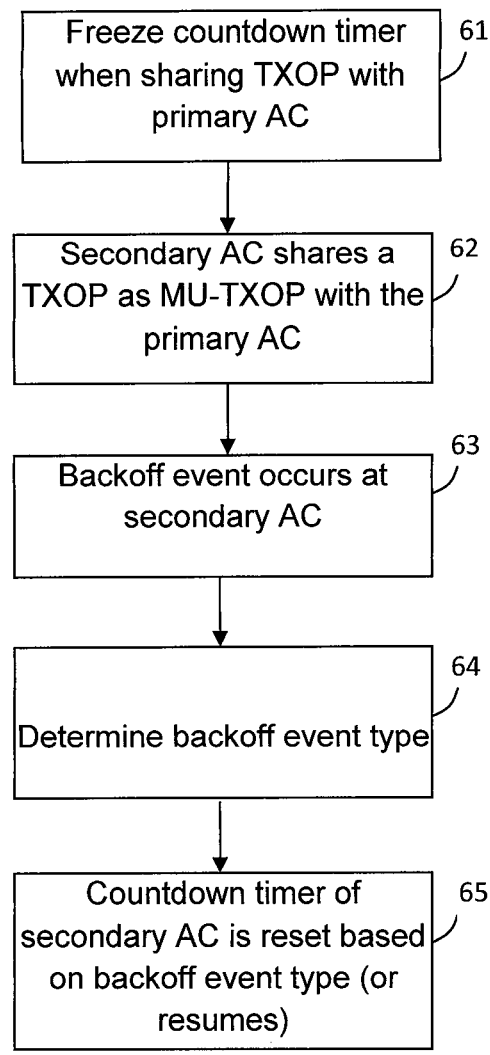
FIG. 6 shows a flowchart for a backoff process in response to a backoff event, according to an embodiment of the invention.

FIG. 6 shows a flowchart of a backoff process 60 for a secondary AC, according to an embodiment of the invention. In process block 61, the secondary AC freezes its countdown timer when sharing a TXOP with the primary AC. In process block 62, the secondary AC shares a TXOP with the primary AC for transmitting its data frames. In process block 63, a back off events occurs at secondary AC of the transmitting station. In process block 64, the secondary AC determines the type of the backoff event. In process block 65, at the end of the TXOP sharing, the countdown timer of the secondary AC is either reset to a different value for each type of backoff event, or resumes by continuing its count down from where it left off before said TXOP sharing. In one embodiment, backoff processes for the primary and secondary ACs are implemented by the MAC layer of the wireless stations (e.g., MU-TXOP module 16 in FIG. 1).

Example backoff process implementations according to the process 60 for a secondary AC, in relation to each of said backoff events are described below.

Secondary AC backoff process in response to backoff Event a:
- A backoff Event a does not occur at a secondary AC because if the wireless communication medium is busy, the primary AC will not obtain an TXOP. If the communication medium is physically busy, the transmitting station secondary AC should perform backoff as in conventional procedure. If the communication medium is virtually busy, the secondary AC checks if any other AC of the transmitting station has obtained the TXOP and whether sharing the TXOP is possible. If sharing of TXOP is granted to the secondary AC, the secondary AC will then transmit and will not invoke backoff. Otherwise, the secondary AC invokes backoff as in the conventional procedure.

Secondary AC backoff process in response to backoff Event b:
- A first example backoff process for a secondary AC in response to a backoff Event b involves the secondary AC resuming backoff timer countdown. This is because an opportunity to share TXOP of another AC should not affect transmission by the secondary AC itself.
- A second example backoff process for a secondary AC in response to a backoff Event b involves the secondary AC backing off with CW reset to a predetermined minimum contention window value CWmin. In this case, a new backoff timer value overwrites a frozen backoff timer value before the TXOP sharing.

Because in this case the secondary AC is sharing the TXOP obtained by the primary AC, its transmission of data frames is limited by the length of TXOP obtained by the Primary AC. This is because the sharing rule requires the time used to transmit the frames of secondary AC cannot exceed the time used to transmit the frames of the primary AC. Therefore, the length of the shared TXOP may or may not fulfill the requirement of transmitting what the secondary plans to transmit.

To facilitate understanding, assume the secondary AC plans to transmit M frames if it gets its own TXOP. When sharing the TXOP obtained by the primary AC, the secondary AC can transmit only N frames. Also assume the $N^{th}$ frame was transmitted successfully. There are two cases the transmitting station secondary AC needs to consider.

Case 1: M<N
- In this case, the secondary AC has finished transmission of what it plans to transmit as if the TXOP was obtained by itself. Therefore, the secondary AC invokes backoff as routine.

Case 2: M>N
- In this case, the secondary AC has not finished transmission of what it plans to transmit as if the TXOP was obtained by itself wherein the desired transmission is partially finished. The AC resumes its transmission when it gets its own TXOP or an opportunity of sharing again with other primary TXOPs that will follow. To do this, the secondary AC can freeze its original values of CW and backoff timer at the start of the TXOP sharing and resume the count down after the initial successful transmission.

Secondary AC backoff process in response to backoff Event c:
- In this case, a transmission failure has just occurred. In a first implementation of secondary AC backoff in response to a backoff Event c, according to an embodiment of the invention, the secondary AC checks whether it is the only AC that experienced a transmission failure.
  Case 1: If the secondary AC is not the only AC that experienced a transmission failure, more than one AC that shared the same TXOP experienced a transmission frame collision. Therefore, the collision is in the vicinity of the transmission sender wireless station. To avoid further collisions, the secondary AC requests to backoff, together with other ACs that experienced the transmission failure.
  Case 2: If the secondary AC is the only AC that experienced a transmission failure, the transmission failure only occurred at one specific receiving wireless station. It is possible that the collision only occurs in the spatial area (vicinity) of the receiving wireless station. Because the failed frame was transmitted using beamforming, a collision occurring in one area does not mean it occurred in other areas. Therefore, the transmission sender wireless station can attempt a more aggressive procedure using DBB.
  Using DBB, the AC can invoke backoff only in the direction where the transmission failure occurred. For example, if transmission to STA-D failed, the backoff can be marked only for STA-D. For other directions where transmission failures have not occurred, the AC can maintain its original values of CW and backoff timer before the TXOP sharing and resume the count down after the initial successful transmission by sharing.

Figure 7:
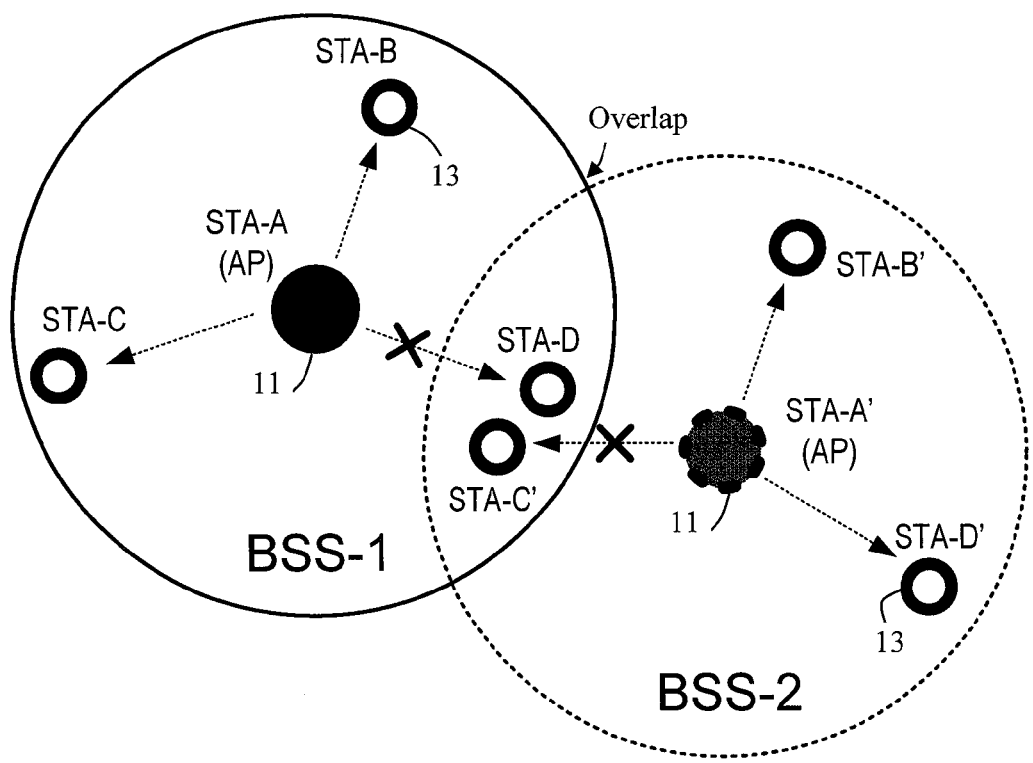
FIG. 7 shows a wireless communication system with overlapping wireless networks, implementing backoff procedures, according to an embodiment of the invention.

Referring to the example communication system 70 in FIG. 7, two WLAN networks, BSS-1 and BSS-2, are operating with certain coverage areas overlapped. Assume that in BSS-1 when the AP STA-A is directionally transmitting a frame to STA-D, at the same time in BSS-2 the AP STA-A' is directionally transmitting a frame to STA-C'. This leads to a collision in the vicinity of STA-D and STA-C' (as shown by "x" markings). However, the frames directionally transmitted from STA-A to STA-B and STA-C in BSS-1 will not be affected by the collision of STA-D and STA-C' frames.

Therefore, in BSS-1 only the AC associated with STA-D requires backoff invocation. Later, when the AC gets it own TXOP, if the TXOP is obtained when the original timer counts down to zero, only frames destined to receiver STAs that did not experience transmission failures in the previous TXOP can be sent. If the TXOP is obtained when the direction-specific timer counts down to zero, frames destined to all receiver STAs can be sent, including the ones that have experienced collision.

In a second implementation of secondary AC backoff in response to a backoff Event c, according to an embodiment of the invention, a first approach involves invocation of exponential backoff, wherein the transmit opportunity of the secondary is skipped. In a second approach, the transmission is stopped and countdown resumed, wherein the AP can select another secondary AC to share the TXOP with, or it can select a different receiver station within the same secondary AC to share the TXOP with.

Secondary AC backoff process in response to backoff Event d:

In an implementation of secondary AC backoff in response to a backoff Event d, the sending wireless station checks whether an internal collision can be resolved by TXOP sharing. If the internal collision cannot be resolved by TXOP sharing, then exponential backoff is invoked. If the internal collision can be resolved by TXOP sharing, the AP (coordinator) decides whether to invoke backoff based on the transmission status, success or failure, as described in the backoff procedures for Events b and c, respectively, according to the invention. TXOP sharing may not be possible when, for example, two transmitting station ACs are targeting at the same receiver station, or strong interference exists between two spatial streams to the two receiver stations.

As is known to those skilled in the art, the aforementioned example architectures described above, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments can take the form of an entirely hardware embodiment, an entirely software embodiment or an embodiment containing both hardware and software elements.

Figure 8:
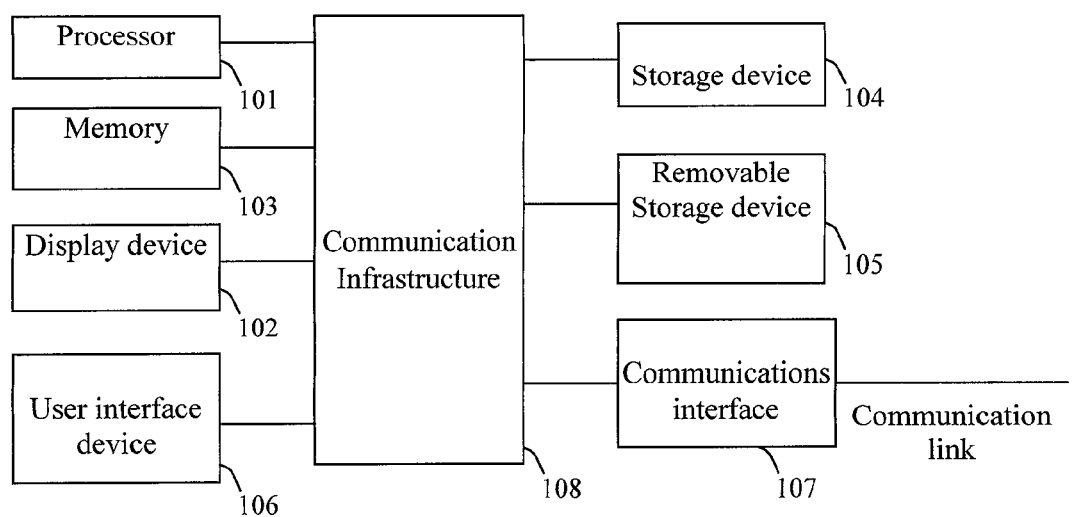
FIG. 8 is an exemplary high level block diagram showing an information processing system comprising a computer system useful for implementing disclosed embodiments.

FIG. 8 is a high level block diagram showing an information processing system comprising a computer system 100 useful for implementing disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed:

1. A method of wireless communication in a wireless communication system, comprising:
   receiving a data frame transmitted from an access point during a transmission opportunity (TXOP), wherein the data frame comprises data corresponding to primary access category or secondary access category of the access point; and
   processing the data frame,
   wherein when Enhanced Distributed Channel Access Function (EDCAF) of the secondary access category experiences an internal collision with EDCAF of the primary access category, backoff procedure is invoked.

2. The method of claim 1, wherein the primary access category is associated with EDCAF that gains channel access, and the secondary access category is not associated with EDCAF that gains channel access.

3. The method of claim 1, wherein a data of the primary access category and a data of the secondary access category are simultaneously transmitted during the TXOP by using TXOP sharing.

4. The method of claim 3, wherein the TXOP sharing is allowed when a data of the primary access category is transmitted in the data frame and resource permits a data from the secondary access category to be included in the data frame.

5. The method of claim 3, wherein duration of the TXOP is TXOP limit of the primary access category.

6. A terminal in a wireless communication system, comprising:
   a receiver configured to receive a data frame transmitted from an access point during a transmission opportunity (TXOP), wherein the data frame comprises traffic corresponding to primary access category or secondary access category of the access point; and
   a controller configured to process the data frame,
   wherein when Enhanced Distributed Channel Access Function (EDCAF) of the secondary access category experiences an internal collision with EDCAF of the primary access category, backoff procedure is invoked.

7. The terminal of claim 6, wherein the primary access category is associated with EDCAF that gains channel access, and the secondary access category is not associated with EDCAF that gains channel access.

8. The terminal of claim 6, wherein a data frame of the primary access category and a data frame of the secondary access category are simultaneously transmitted during the TXOP by using TXOP sharing.

9. The terminal of claim 8, wherein the TXOP sharing is allowed when a data of the primary access category is transmitted in the data frame and resource permits a data from the secondary access category to be included in the data frame.

10. The terminal of claim 8, wherein duration of the TXOP is TXOP limit of the primary access category.

* * * * *